United States Patent [19]
Akeel et al.

[11] Patent Number: 5,459,925
[45] Date of Patent: Oct. 24, 1995

[54] PLANETARY TYPE SPEED REDUCER HAVING COMPOUND PLANETS AND METHOD OF CONSTRUCTING SUCH PLANETS

[75] Inventors: Hadi A. Akeel, Rochester Hills; Stan H. McClosky, Rochester, both of Mich.

[73] Assignee: Fanuc Robotics North America, Inc., Auburn Hills, Mich.

[21] Appl. No.: 21,999

[22] Filed: Feb. 24, 1993

[51] Int. Cl.⁶ .................................................. B21D 53/28
[52] U.S. Cl. .............................. 29/893.2; 901/25; 475/344
[58] Field of Search ............................ 29/893.2; 475/338, 475/339, 344; 901/25

[56] References Cited

U.S. PATENT DOCUMENTS

| | | | |
|---|---|---|---|
| 328,014 | 10/1885 | Cushman | 475/339 |
| 2,150,540 | 7/1937 | Chilton . | |
| 3,239,699 | 3/1966 | Ferrary . | |
| 3,596,538 | 8/1971 | Braun . | |
| 3,705,522 | 12/1972 | Ogawa . | |
| 4,601,216 | 7/1986 | Inoue et al. . | |
| 4,690,001 | 9/1987 | Matsumoto et al. . | |
| 4,850,457 | 7/1989 | Taig . | |
| 4,864,893 | 9/1989 | Hori | 475/344 |
| 4,918,344 | 4/1990 | Chikamori et al. . | |
| 5,178,587 | 1/1993 | Ichiki | 475/344 |

FOREIGN PATENT DOCUMENTS

| | | |
|---|---|---|
| 367144 | 6/1939 | Italy . |
| 8500859 | 2/1985 | WIPO . |

Primary Examiner—P. W. Echols
Attorney, Agent, or Firm—Brooks & Kushman

[57] ABSTRACT

A planetary type speed reducer provides a large central hole for passing electric and service lines for a robot therethrough. The speed reducer may be used in either a self-motorized or an externally-motorized rotary joint. In a predetermined embodiment, the speed reducer includes a cylindrical carrier and multiple compound gear planets which are rotatably mounted on their respective shafts some of which, in turn, are eccentrically mounted on the carrier. A method for manufacturing the gear planets is also provided. Each of the gears has two sections or parts which are shifted angularly relative to each other and are adapted to engage adjacent fixed output gears of the rotary joint.

7 Claims, 5 Drawing Sheets

PLANETARY TYPE SPEED REDUCER HAVING COMPOUND PLANETS AND METHOD OF CONSTRUCTING SUCH PLANETS

CROSS-REFERENCE TO RELATED APPLICATION

This application is related to an application entitled "Motorized Rotary Joint And Method Of Constructing A Modular Robot Utilizing Same" having the same filing date and assignee as the present application now U.S. Pat. No. 5,293,107.

TECHNICAL FIELD

This invention relates to planetary type speed reducers and, in particular, to planetary type speed reducers having compound planets.

BACKGROUND ART

Speed reducers such as cycloidal and harmonic drive speed reducers have been used extensively for robot joints. In modules incorporating such speed reducers, the joint bearing is occasionally integrated with the speed reducer. However, such speed reducers have not fully supported the particular needs of robot construction. For example, it is desirable that the robot joint be hollow to pass cables and service lines through the joints from a base to serially connected joints of the robot arm and finally to its end effector. It is also desirable to avoid the duplication of bearings at the joints wherein the robot joint, the speed reducer, and possibly a motor which drives the speed reducer, have their own independent bearings.

Robots are also subjected to occasional overloads resulting from interference with peripheral equipment. Such interferences could damage the robot and render it inoperable unless the robot joints and reducers have inherently high overload carrying capacities. Furthermore, the robot operation under tight servo controls demands a robot joint having minimal backlash and high stiffness. Robot construction also benefits from the integration of components to simplify manufacturing, assembly, and maintenance and reduce robot cost.

Some commercial speed reducers offer some of these advantages. For example, rotary vector reducers, known as RV reducers, and harmonic drives can be integrated into the robot joints and share common bearings. RV reducers also have low backlash and high overload carrying capacity and can be provided with a small center hole. However, the RV reducer is heavy in weight, costly, and does not offer a hollow center core large enough to be of appreciable value. Harmonic Drives have excessive backlash, low overload capacity, and, do not provide a hollow center. Both drives have very limiting motor mounting options. Custom reducers, utilizing gear trains, can be built to provide the required characteristics but at undesirably high costs, or, with excessive compliance.

U.S. Pat. Nos. 4,601,216 and 2,150,540 to Inoue et al and Chilton, respectively, disclose hollow reduction gears.

U.S. Pat. Nos. 3,705,522 and 3,596,538 to Ogawa and Braun, respectively, disclose speed change mechanisms.

Italian Patent Document No. 367144 and PCT Patent Document No. 8500859 also disclose various types of speed change mechanisms.

U.S. Pat. Nos. 4,918,344, 4,850,457, 4,690,010 and 3,239,699 to Chikamori et al, Taig, Matsumoto et al, and Ferrary, respectively, disclose combined electric motor and speed reducer mechanisms.

In general, it is desirable to have a speed reducer adapted for integration in a robotic rotary joint which has low backlash, and provides optional speed reducing ratios, high overload capability and a large hollow center. Such a rotary joint should be produced at a relatively low cost, have fewer components with high reliability and provide a compact package.

SUMMARY OF THE INVENTION

An object of the present invention is to provide a planetary type speed reducer including compound gear planets and having low backlash, high overload capacity, and ability to provide for a relatively large central, through hole.

Another object of the present invention is to provide a method of manufacturing such gear planets in a cost efficient fashion.

In carrying out the above objects and other objects of the present invention, a planetary type speed reducer adapted to be integrated in a robotic rotary joint is provided. The speed reducer includes a cylindrical carrier adapted to be coupled to a prime mover and having a central hole extending completely therethrough along a central axis of rotation. The carrier has an outside dimension and an inside dimension. The speed reducer includes a plurality of compound gear planets rotatably mounted on the carrier about the circumference of the carrier. Each gear planet includes axially adjacent first and second sections having teeth adapted to be coupled to reaction and output gears, respectively, of the rotary joint. The output gear is rotatable relative to the reaction gear. The carrier provides a central hollow core for passing service lines therethrough parallel to the central axis of rotation. The inside dimension of the carrier is relatively large in relation to the outside dimension of the housing to permit a relatively large number, and sized service lines therethrough.

The invention may be practiced with internal or external planetary gear systems.

Further in carrying out the above objects and other objects of the present invention, a method is provided for constructing compound gear planets for a planetary gear reducer having output and reaction gears. Each of the gear planets includes two sections having teeth. The teeth of one section are angularly phased relative to the teeth of the other section about a common central axis. The method includes the steps of mounting the two sections on a common axis so that both of the sections butt against each other, orienting the two sections relative to each other with a predetermined angular phase shift between the teeth of the sections, and joining the two sections so that the two sections rotate together.

Still further in carrying out the above objects and other objects of the present invention, a method is provided for constructing a plurality of identical planet groups for a planetary gear reducer having output and reaction gears. Each of the groups includes compound gear planets. Each of the gear planets includes two gear sections having teeth, the teeth of one section being angularly phased relative to the teeth of the other section about a common central axis. The method includes the steps of providing the two gear sections of each gear planet with a number of guideways equally angularly spaced around its common central axis such that the number of guideways of each gear planet is a multiple of the number of gear planets in one of the planet groups, and wherein the number of teeth of each gear section is not a multiple of the number of gear planets in one of the planet groups. The method also includes the step of aligning the two gear sections of each gear planet such that the guideways in each section are aligned and the teeth of the two gear sections are angularly phased relative to each other. Finally, the method includes the step of inserting at least one shear element into the aligned guideways of each gear planet wherein the at least one shear element of each gear planet engages both gear sections so that the gear sections rotate together.

With the above objectives in mind, the invention provides a speed reducer that is:

- supportive of the needs of efficient robot arm construction;
- adaptable for direct coupling with the joint's driving motor;
- inherently capable of providing a large hollow in its central core in relation to its outside dimension;
- inherently compact and light in weight in relation to its load carrying capacity;
- having adjustable backlash capability;
- capable of providing multiple speed reducing ratios with a minimum of modifications;
- inherently capable of withstanding high overloads; and
- has inherently low manufacturing cost.

In further carrying out the above objects and other objects, features and advantages of the present invention, the invention preferably includes the following supporting features:

1. Planetary gearing of the nutating type; thus providing compactness, cylindericity, light weight, and high speed reduction ratios between two adjacent internal or external gears adapted to be coupled thereto.
2. Multiple gear planets; thus providing high load capacity as many gears can be fitted within the cavities of the internal gears, or around the circumference of two sun gears, and share the overall load on the reducer.
3. A compact planet carrier; thus allowing a large internal hollow core in relation to the outside dimension of the reducer.
4. A first stage speed reducing arrangement for driving the carrier from a motor shaft with variable ratios; thus allowing the speed reducer to have multiple ratios within the same enclosure with a minimum of modification, also allowing variable mounting positions for the motor such as parallel to the joint axis with spur gears, or orthogonal to the joint axis with bevel gears.
5. Mounting provisions for direct coupling between the reducer, the motor, and the load; thus allowing the robot joint to be compact, light weight and of low cost by avoiding duplication of parts between the reducer, the motor and the load structures.
6. Packaging the reducer in a cylindrical form most suitable for internal mounting inside rotary robot joints in a minimum of space; thus providing compactness and efficient space utilization.
7. Using conventional gear components which are mass producible at low cost; thus providing a reducer of inherently low cost in relation to its performance features.
8. Mounting a selected number of gear planets on eccentric shafts; thus providing center adjustment for eliminating backlash.
9. Constructing the gear planets from two parts or sections, each angularly shifted from the other to accommodate the progressive shift between the teeth of the two internal, or sun gears, hence allowing more planets to be used and share the load for higher reducer load capacity.
10. Constructing the gears as helical gears mounted on a splined shaft such that the relative axial displacement of the planet parts compensates for backlash.
11. A bearing arrangement surrounding the large hollow core, or external to the structure of the gears; thus inherently having a large bearing diameter and a large load carrying capacity supportive of large loads on the robot joints.

The above objects and other objects, features, and advantages of the present invention are readily apparent from the following detailed description of a preferred mode for carrying out the invention when taken in connection with the accompanying drawings.

BEST MODE FOR CARRYING OUT THE INVENTION

Figure 1:
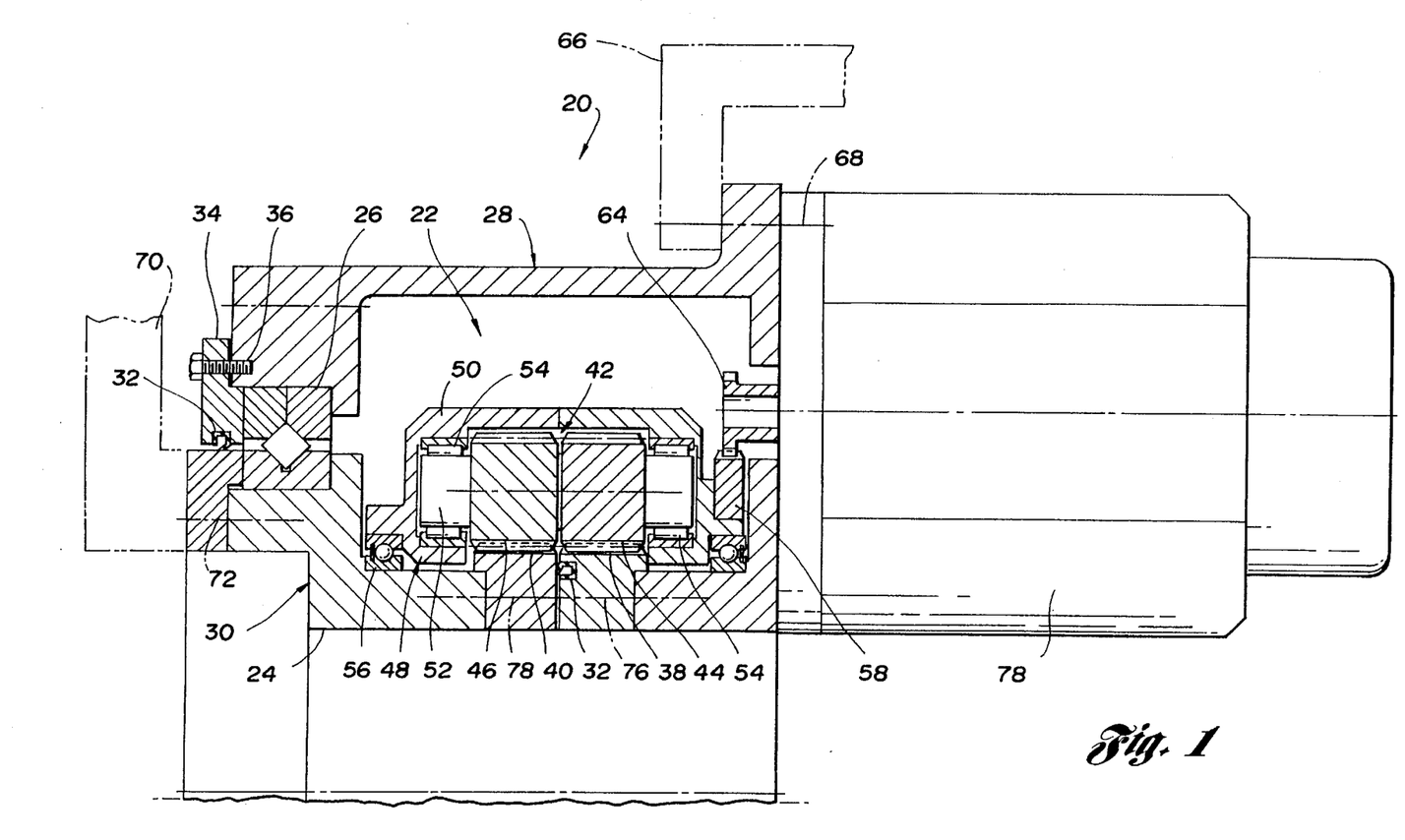
FIG. 1 is a sectional half view of a first embodiment of a rotary joint constructed in accordance with the present invention, with external planetary gears, illustrating a load in phantom lines and an attached motor.

Referring now to the drawing figures, there is illustrated in FIG. 1 a first embodiment of a speed reducer, generally indicated at 22, constructed in accordance with the present invention. The speed reducer 22 is adapted for use in a rotary joint, generally indicated at 20, and will be described with reference thereto hereinbelow.

The speed reducer 22 has a hollow center 24 and is supported by bearings 26 within a housing defined by two structural first and second housing parts, generally indicated at 28 and 30, respectively.

The first housing part 28 is rotatably mounted to the second housing part 30 by means of the bearing 26 and retained in position relative to each other by means of a retainer 34 and secured by a plurality of bolts, only one of which is shown at 36. The first housing part 28 is coupled to a reaction gear 38 by fasteners having center line 76. The gear 38 is adjacent to an output gear 40 which is coupled to the second housing part 30 by fasteners having center line 78.

The speed reducer 22 includes a plurality of compound gear planets, generally indicated at 42. Each gear planet 42 has two sections 44 and 46 which engage the teeth of the gears 38 and 40, respectively. Only one gear planet 42 is shown.

The gear planets 42 are supported by a carrier assembly, generally indicated at 48. The carrier assembly 48 includes a spool-shaped carrier 50, which is U-shaped in cross-section, axles 52 and bearings 54. The axles 52 extend between the side flanges of the carrier and the bearings 54 rotatably support each gear planet 42 on its axle 52. The carrier assembly 48, in turn, is rotatably supported on the second housing part 30 by means of bearings 56.

A carrier driving element such as a gear 58, as shown in FIG. 1, is drivingly coupled to the carrier 50, and also engages another driving element such as a motor pinion 64 of a motor 78. A mounting plate 66 (partially shown in phantom lines) is attached to the first housing part 28 by means of a plurality of threaded bolts having center lines (one shown at 68). The mounting plate 66 is one of two relatively movable structural elements of a typical rotary robot joint.

The second housing part 30 is also coupled to a second joint element 70 by fasteners (not shown) at center lines (one shown at 72). The second joint element 70 represents a second structural element of the robot joint 20 movable relative to the first element or plate 66 of the robot joint 20. The robot joint 20 also includes seals 32, preferably mounted between parts integral to or attached to the first and second housing parts 28 and 30 to prevent the leakage of lubricants necessary for the operation of the internal gearing.

FIG. 1 shows the bearing 26 located external to the gear planets 42. The rotary joint 20 of FIG. 1 is a preferred embodiment when the load carrying capacity and rigidity of the bearing 26 is to be maximized in relation to the torque output of the planetary reducer 22.

Figure 2:
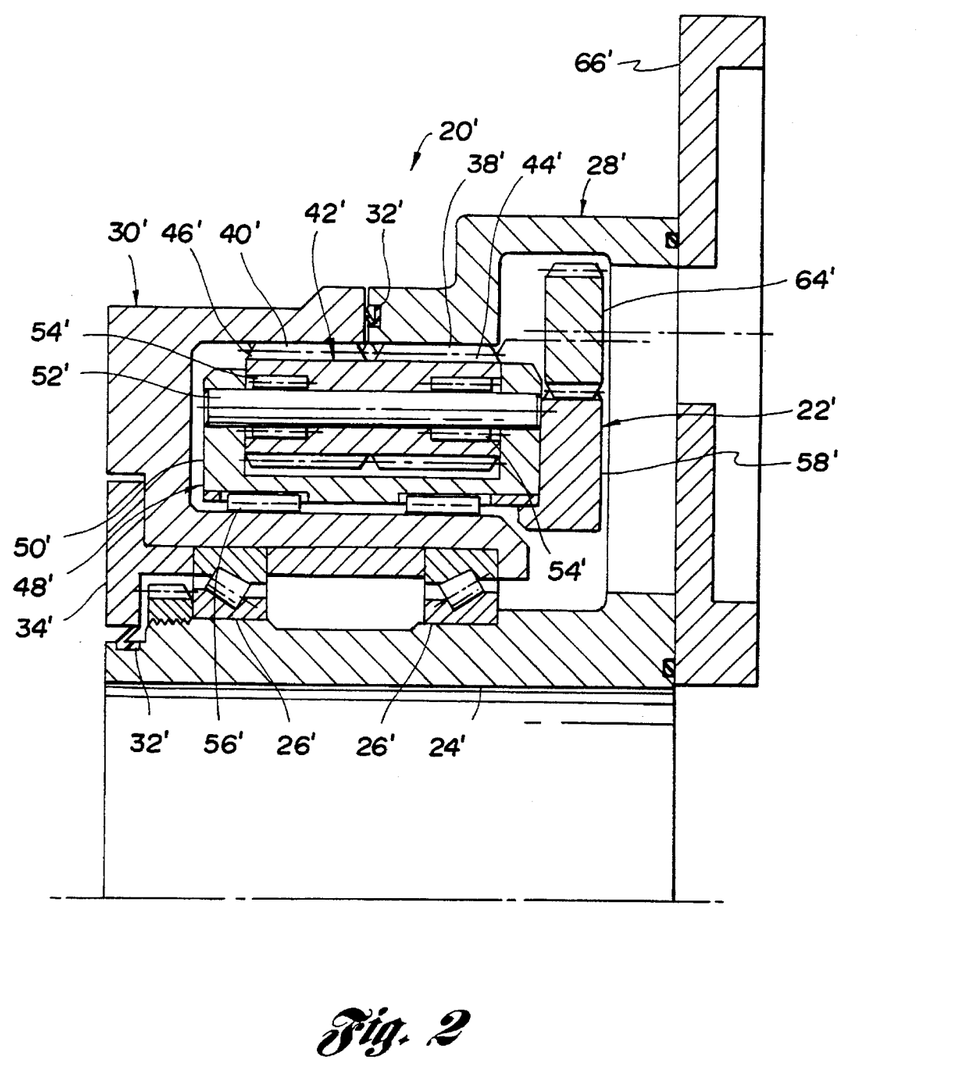
FIG. 2 is a view similar to FIG. 1 but illustrating a second embodiment of a rotary joint of the present invention having internal planetary gears.

FIG. 2 shows another embodiment of a rotary joint 20' of the invention wherein the bearing 26 is replaced by bearings 26' internal to gear planets 42'. The same or similar components to those components of FIG. 1 have the same reference number but have a single prime designation.

The embodiment of FIG. 2 allows larger internal gears and more gear planets 42' to be used within the same outside dimensions of the embodiment of FIG. 1, thus allowing much higher torque output capacity for the rotary joint 20'. On the other hand, the bearings 26' have a smaller diameter and are two in number to provide the equivalent load carrying capacity and rigidity of the embodiment of FIG. 1. The second embodiment also provides a large hollow center 24' at the core of the reducer 22'. Gears 58' and 64' may be replaced by bevel gears if a different orientation for a drive motor is desired.

Figure 3A:
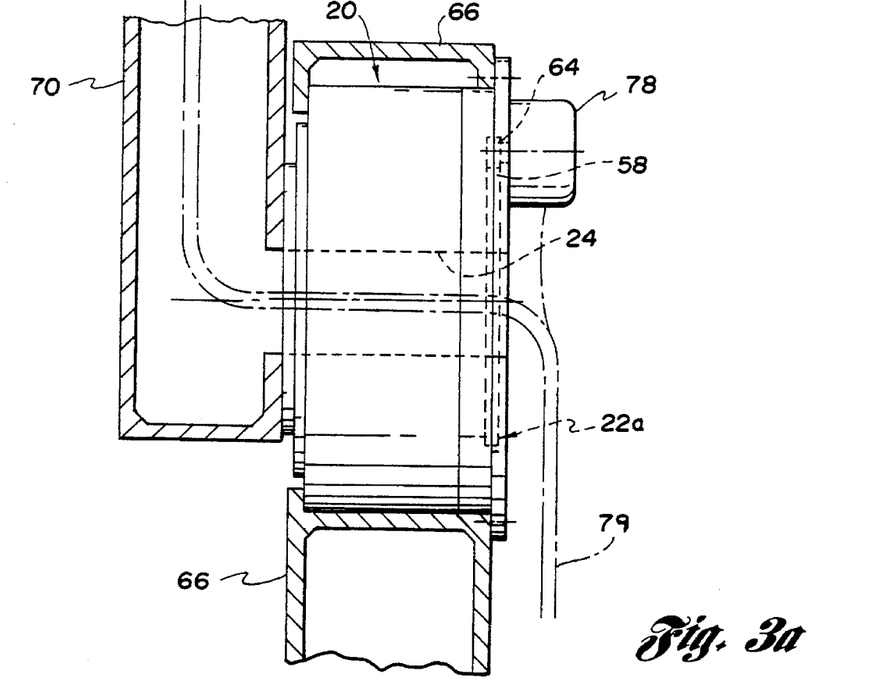
FIG. 3a is a sectional view of the rotary joint of FIG. 1 with a motor and a cable bundle attached to the outside of a robot arm.
Figure 3B:
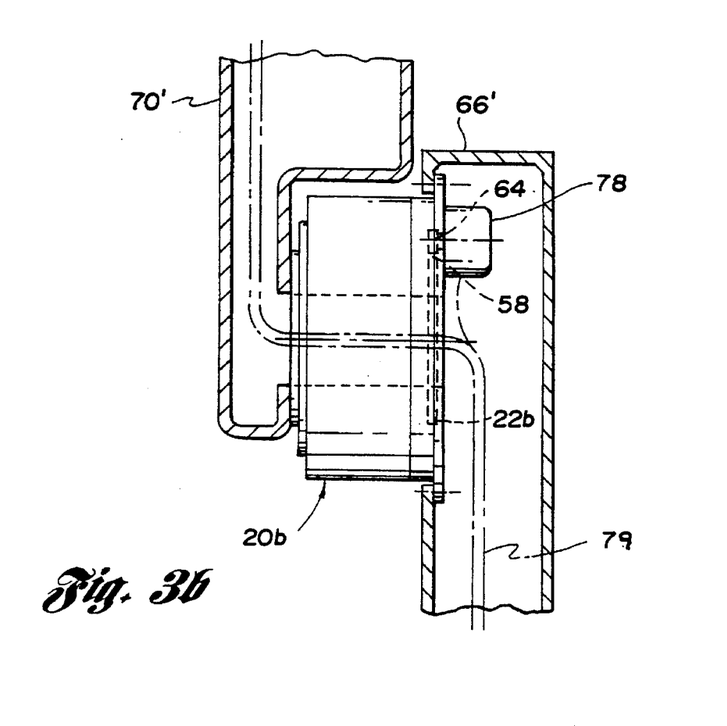
FIG. 3b is a sectional view of the rotary joint of FIG. 1 with a motor and a cable bundle enclosed entirely within a robot arm.

FIGS. 3a and 3b show two mounting variations of the basic elements of the rotary joint 20 in relation to a typical robot arm structure. FIG. 3a shows the rotary robot joint 20 between the robot parts 70 and 66 with a motor 78 attached to the outside of a robot arm 66. A cable bundle 79 which services the motor 78 and other motors (not shown) of the robot is shown passing through the robot joint 20 from the exterior of the one arm part 66 to the inside of the other arm part 70 through the hollow center 24 of the rotary joint 20.

FIG. 3b shows the motor 78 mounted inside a first arm part 66' and the cable bundle 79 completely enclosed inside the rotary joint 20 as well as first and second arm parts 66' and 70', respectively.

For high ratio planetary reducers of the type described herein, the number of teeth of the reaction gear 38 may differ only slightly, usually by 1 to 5 teeth, from those of the adjacent output gear 40. When gears of the same module are used, the gear sections 44 and 46 can be identical, while gears 38 and 40 have different tooth forms. Conversely, if gears 38 and 40 have similar tooth forms, one of gear sections 44 or 46 would have a different form. However, the gear sections 44 and 46 must be assembled on the axle 52 such that their teeth are not necessarily aligned with each other but with the teeth of the mating gears 38 and 40, respectively.

Assuming that $Z_1$, $Z_2$, $Z_3$, and $Z_4$ equal the number of teeth of the gears 38 and 40 and the sections 44 and 46, respectively, the total reduction ratio, R, of the planetary reducer 20 is the ratio between the rotational speed of the carrier 50 to that of the output gear 40, where, $R=1/(1-Z_4Z_1/Z_2Z_3)$; and, $R=1/(1-Z_1/Z_2)$ when $Z_3=Z_4$. Accordingly, a high ratio is attained when $Z_1/Z_2$ approach 1.0 or when $Z_1$ approaches $Z_2$.

For example, assuming $Z_2=100$ and $Z_1=99$, then, $R=100$ and the teeth of gears 38 and 40 can be aligned only at one location, hence, only one single-gear planet, i.e., having straight teeth that straddle booth gears 38 and 40, can be used.

When $Z_1=98$, then, $R=50$ and two single gear planets can be used. A small difference between $Z_1$ and $Z_2$ allows only an equally small number of single gear planets to engage both of gears 38 and 40 when their teeth are aligned. To allow the reducer 20 to transmit higher torque and power, more planets must be used than is allowed by the alignment of the teeth of gears 38 and 40.

Compound planets having two parts of angularly shifted teeth allow as many planets to be used as can be fitted around a sun gear or inside an internal gear. Compound planets are also required when $Z_2$ and $Z_4$ are not equal since a common planet cannot be cut with different teeth in each of its gears unless they are widely separated from each other, in which case the reducer 20 would increase objectionably in length.

Figure 4A:
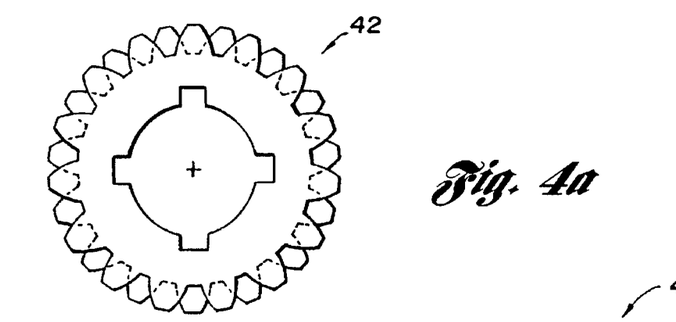
FIG. 4a is an end view of a gear planet with ½ pitch shift.
Figure 4B:
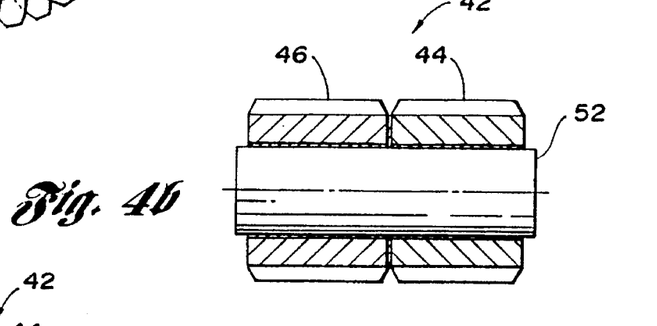
FIG. 4b is a side elevational view of a bonded gear planet.
Figure 4C:
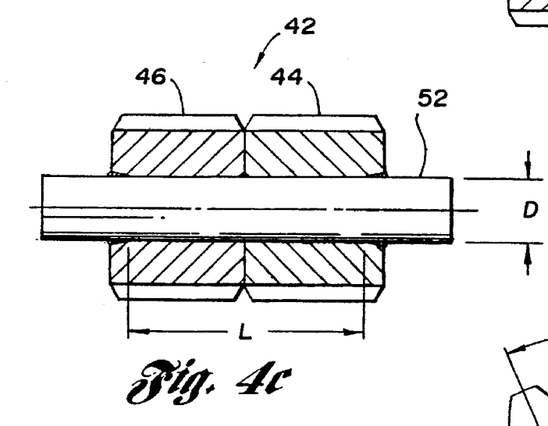
FIG. 4c is a side elevational view of a welded gear planet.
Figure 4D:
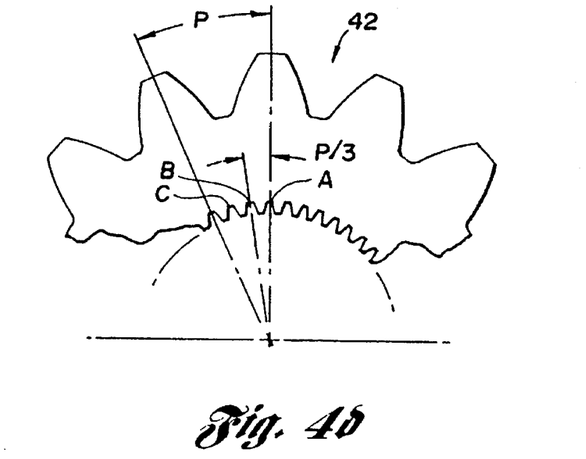
FIG. 4d is a half end view of a gear planet having a fine pitch spline.
Figures 4E, 4F, 4G, 4I:
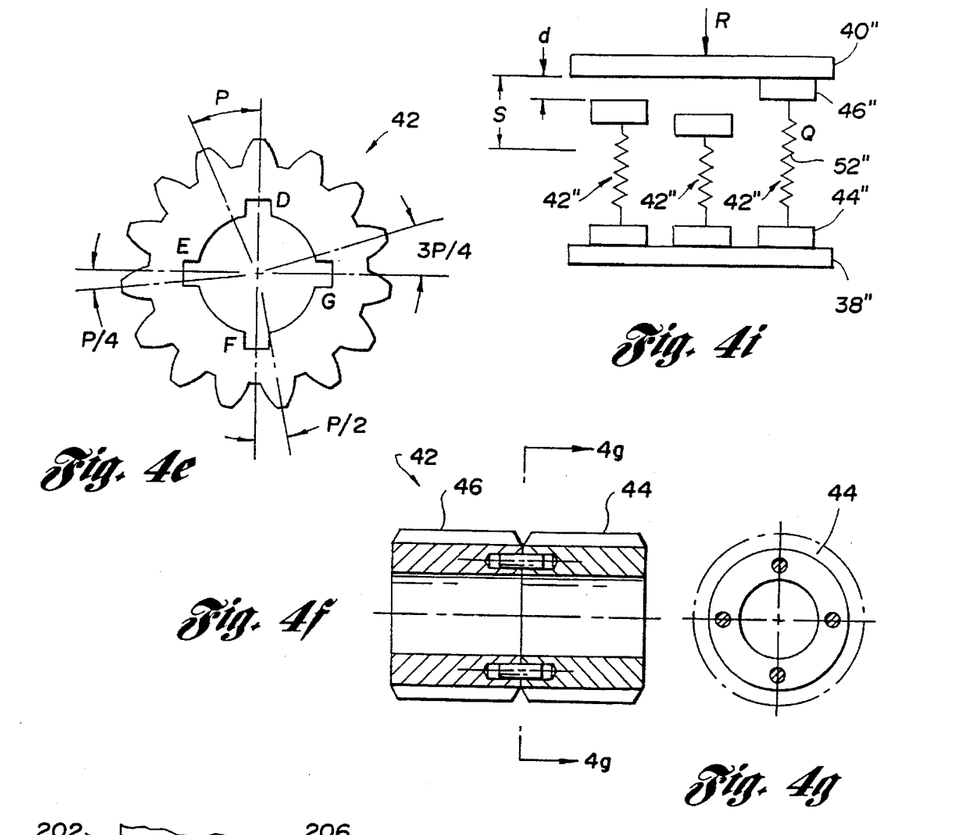
FIG. 4e is an end view of a gear planet illustrating orientation of its teeth and guideways.
FIG. 4f is a side sectional view of a gear planet having its sections connected together by pins.
FIG. 4g is a view taken along lines 4g—4g in FIG. 4f.
FIG. 4i is a schematic view of a gear planet wherein torsional displacements are replaced by linear displacements.

For example, for a difference $Z_2-Z_1=s$, and $Z_1$ and $Z_2$ are, preferably, multiples of s, gears 38 and 40 will have their teeth aligned at s locations, where s number of equally spaced single gear planets can be used. If 3s equally spaced planets are used, there would be s similar planet groups; ⅓ of the planets would be single gear planets; ⅓ would have compound construction with one part phase shifted angularly by p/3 from its adjacent part; and ⅓ will be angularly shifted by 2p/3; where p is the angular pitch between two adjacent planet teeth, as shown in FIG. 4e.

In general, if there are N equally spaced planets, and N is a multiple n of s, there will be s similar planet groups each containing n=N/s different compound planets having angular shifts of ip/n, where, $i=1,2\ldots,n$. If neither N, $Z_1$ nor $Z_2$ are multiples of s, all N planets could be different and may not be similarly grouped.

Methods of Construction of Compound Planets

Since compound planets of two parts or sections must mesh with two co-centric gears having different number of teeth, the two parts must have two sets of teeth shifted by a predetermined angle relative to each other. The planet parts must also be positively coupled to transfer their full torque capacity from one part to the other. The two parts may be coupled directly to one another, or through a positive torque transmission element such as a keyed shaft or sleeve. The following are methods of construction realizing these objectives.

Construction Method #1

Two planet parts are mounted on a common axle, or hollow sleeve, angularly rotated to the appropriate phase shift of ip/n and then fixed permanently in relation to each other. FIG. 4a shows a ½ pitch shift. The fixing is preferably done by a joining process that does not disturb the integrity of the finished planet parts, such as by bonding, or, welding by an electron or laser beam. FIG. 4b shows a bonded compound planet 42, and FIG. 4c shows a welded compound planet 42.

Alignment prior to bonding may be done by any conventional method. For example, the gears 38 and 40 may be used as templates, with at least one tooth of each gear aligned, and the two unbonded planet parts may be located at the desired meshing location, hence getting their phase relationship directly from gears 38 and 40. Indexing divides may also be used to provide the desired angular phase shift between the two planet parts before fixing.

Construction Method #2

Two planet parts or sections are provided with a splined bore and are slidably mounted on a mating splined shaft or hollow sleeve. The angular pitch of the splined shaft is p/n (the tooth pitch of the planet divided by the number of gear planets in one group). FIG. 4d shows one part of a compound gear planet 42 constructed with n=3.

When mated with a similar part, tooth shifts of p/3 or 2p/3 are attained, depending on whether teeth B or C are aligned, respectively, for two planet parts. When the teeth, designated similarly, are aligned, an equivalent of a single gear planet is constructed. This method is suitable when n is a small number and the pitch p is large. Otherwise, the spline pitch p/n becomes too fine to carry the torque of the gear planets.

Construction Method #3

This is similar to Method #2 except that the spline has a number of teeth that is a multiple of n, and the number of planet teeth is not a multiple of n. The splined hollow may be replaced by any type of guideways accepting mechanical inserts that transmit shearing forces between the two planet parts, such as pins and keys.

Example: If $Z_2=99$, $Z_1=96$ and 12 planets are used, then $s=Z_2-Z_1=3$ and $n=12/3=4$ hence, 3 planet groups are required and each group includes 4 planets having tooth shifts of p/4, p/2, 3p/4, p (i.e. aligned as a single gear), respectively. The number of teeth in the spline should be a multiple of n=4 such as 4,8,12, . . . etc. Conversely, the number of teeth of the planet should not be any of these numbers. The condition of n=4 and $Z_3=15$ is illustrated in FIGS. 4a and 4e.

Accordingly, with reference to FIGS. 4a and 4e, the compound gear planets can be assembled on a common axle with the desired angular shift by having a common spline tooth, or a single common key, engage a corresponding keyway in one part, at D, for example, and in the second part at E for a p/4 shift; at F, for a p/2 shift, at G for a 3p/4 shift, or at D for a zero shift. FIG. 4a shows the condition of aligning a slot of one planet part with a slot of the other planet part to obtain a p/2 phase shift.

With Method #3, a single mechanical key may be used on the axle to mate with cavities of the splined bore of the planet parts, or, a fully splined shaft may be used allowing high torques to be transmitted by the planets.

Alternately, engaging one or multiple pins, with a number of holes, n, in the mating faces of two planet parts as illustrated in FIGS. 4f and 4g, provides the same phasing results. Radial keyways may also be cut in mating surfaces and keyed by one or multiple keys.

Backlash Elimination

Backlash may be eliminated by any of well known methods such as by mounting the gear planets on eccentric shafts wherein the displacement of the shaft moves the gear planets radially inward or outward to bring their teeth closer to the mating input and output gears.

Figure 4H:
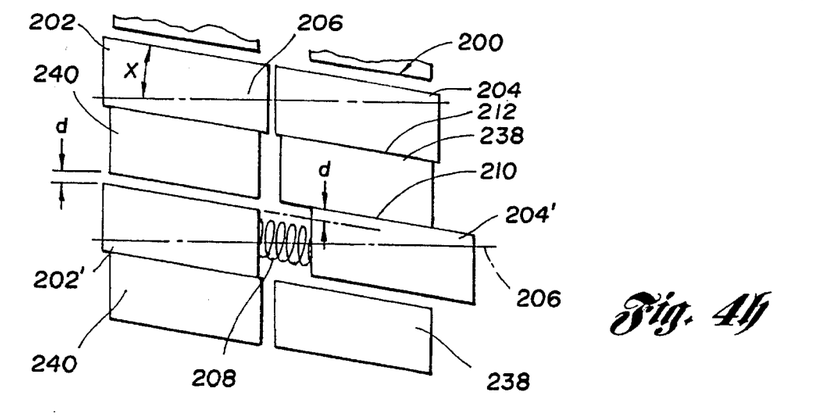
FIG. 4h is a diagrammatic representation of a side view of reducer gearing illustrating how to eliminate backlash.

In a preferred embodiment, a reducer gearing generally indicated at 200 in FIG. 4h, has a helical gear geometry with helix angle X. Gear planet parts 202 and 204 are mounted on a splined axle allowing axial movement parallel to an axis 206. At least one planet has an axial spring 208 forcing the two planet sections or parts 202' and 204' apart (or together), a backlash margin of d is indicated.

When assembled with mating gears 238 and 240, the planet parts are forced by the spring 208 to engage opposite faces 210 and 212 of the mating gears 238 and 240, hence eliminating backlash.

Load Sharing Among Compound Planets

To realize the maximum load capacity of a planetary type reducer with multiple planets, the load torque must be shared evenly by all of the planets. Numerous parameters such as tooth size, tooth spacing, bearing raceway eccentricity, and center distance place practical limits on the amount of precision which can be achieved and ultimately result in uneven load distribution.

Incorporating a fixed backlash adjustment at each compound planet, by methods previously described, can help distribute the load more evenly among the compound planets. The amount of load sharing which results is limited since effects of varying backlash, such as that which results from bearing raceway eccentricity, have not been accommodated.

A preferred embodiment is shown schematically in FIG. 4i wherein elements corresponding to FIG. 1 and 4c are given the same numeral with double prime designation, and wherein torsional displacements are represented by linear displacements. A predetermined amount of angular compliance Q is incorporated between the two planet parts 44" and 46" of each compound planet 42". When a load R is applied to the output gear 40", the resultant angular deflection S between the output gear 40" and the reaction gear 38" allows additional compound planets to support the load as the backlash d of each compound planet is eliminated. The magnitude of angular compliance is optimized with consideration given to the amount of load sharing and the resultant drive train torsional stiffness.

A method of construction for the compound planet which provides angular compliance between planet parts 44 and 46 is shown in FIG. 4c. The welds which fix the planet parts to the axle 52 are at the outside faces of the planet parts 44 and 46. The axle 52 acts as a torsion bar which will deflect under load. When the planet part 46 is subjected to a torsional load T with the planet part 44 fixed, the amount of angular deflection U of planet part 46 can be controlled by selection of: axle length between welds, L, axle diameter, D, and material modulus of rigidity, G, according to the torsional deflection relationship:

$$U = T \times Q$$

$$Q = \frac{L}{G \times J}$$

$$J = \frac{\pi \times D^4}{32} \text{ for a solid round section}$$

A rotary joint incorporating a speed reducer of the present invention integrates some critical robot design elements into one module that can be optimized for power, compactness, reliability, and cost. It also allows the robot designer a high level of modularity which improves robot reliability, cost, maintenance, and serviceability.

It should also be obvious that the invention provides a versatile method for the simple, low-cost, construction of complex robots.

While the best mode for carrying out the invention has been described in detail, those familiar with the art to which this invention relates will recognize various alternative designs and embodiments for practicing the invention as defined by the following claims.

What is claimed is:

1. A method for constructing compound gear planets for a planetary gear reducer having output and reaction gears, each of the gear planets including two sections having teeth, the teeth of one section being angularly phased relative to the teeth of the other section about a common central axis, a method comprising the steps of:

mounting the two sections on a common axis so that both of the sections butt against each other;

orienting the two sections relative to each other with a predetermined angular phase shift between the teeth of the sections; and joining the two sections so that the two sections rotate together wherein the two sections are mounted on and joined to a common axle at opposite ends of the common axle to allow the common axle to provide angular compliance between the two sections and hence allowing for load sharing among compound gear planets engaging a common reaction gear and a common output gear.

2. The method of claim 1 wherein the two sections are joined to each other.

3. The method of claims 1 or 2 wherein the step of joining is accomplished with a bonding compound.

4. The method of claims 1 or 2 wherein the step of joining includes the step of welding.

5. The method of claim 4 wherein the step of welding is accomplished with an electron beam.

6. The method of claim 4 wherein the step of welding is accomplished with a laser beam.

7. The method of claim 1 wherein said axle is a hollow sleeve.

* * * * *